(12) United States Patent
Norris

(10) Patent No.: US 6,466,674 B1
(45) Date of Patent: *Oct. 15, 2002

(54) METHOD AND APPARATUS FOR ELIMINATING AUDIO FEEDBACK

(75) Inventor: Elwood G. Norris, Poway, CA (US)

(73) Assignee: American Technology Corporation, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/643,018

(22) Filed: Aug. 21, 2000

Related U.S. Application Data

(63) Continuation-in-part of application No. 08/868,739, filed on Jun. 4, 1997, now Pat. No. 6,108,427, and a continuation-in-part of application No. 08/684,311, filed on Jul. 17, 1996, now Pat. No. 5,889,870.

(51) Int. Cl.$^7$ .......................... H04R 27/00; H04B 15/00
(52) U.S. Cl. ............................... 381/93; 381/83
(58) Field of Search ..................... 381/83, 93

(56) References Cited

U.S. PATENT DOCUMENTS

| | | | | |
|---|---|---|---|---|
| 1,951,669 A | * | 3/1934 | Ramsey | 381/83 |
| 5,357,578 A | * | 10/1994 | Taniishi | 381/190 |
| 5,649,019 A | * | 7/1997 | Thomasson | 381/83 |
| 5,919,134 A | * | 7/1999 | Diab | 600/323 |
| 6,108,427 A | * | 8/2000 | Norris et al. | 381/83 |

* cited by examiner

*Primary Examiner*—Forester W. Isen
*Assistant Examiner*—Laura A. Grier
(74) *Attorney, Agent, or Firm*—Thorpe North & Western L.L.P.

(57) ABSTRACT

The present invention is embodied in a method and apparatus for eliminating audio feedback which includes an active microphone coupled to an amplifier which transmits signals received at the active microphone to a parametric speaker to generate a feedback controlled signal for broadcasting. The apparatus may also be adapted for use with an audio system wherein the invention comprises (i) at least one transducer for detecting at least one sonic frequency and generating an electrical signal representative of the at least one sonic frequency, (ii) a processor for receiving the electrical signal and generating a first ultrasonic frequency which has been modulated with the at least one sonic frequency, (iii) a parametric demodulator for recovering the at least one sonic frequency from the first ultrasonic frequency, and (iv) a speaker for directly emitting the recovered sonic frequency as a feedback controlled audio emission.

23 Claims, 8 Drawing Sheets

METHOD AND APPARATUS FOR ELIMINATING AUDIO FEEDBACK

This patent application is a continuation-in-part of application Ser. No. 08/684,311, filed Jul. 17, 1996, now U.S. Pat. No. 5,589,570 and application Ser. No. 08/868,739 filed on Jun. 4, 1997 now U.S. Pat. No. 6,108,427.

BACKGROUND OF THE INVENTION

1. Field of the Invention

This invention pertains to audio amplification. Specifically, the present invention relates to a device and method for eliminating undesirable audio feedback which occurs when audible sound travels from a loudspeaker to a live or active microphone, when the loudspeaker is amplifying audio signals received at the active microphone.

2. State of the Art

Audio feedback is more than a nuisance in state of the art audio systems. This is because it can cost time and money to physically configure or reconfigure audio systems to reduce, but not eliminate, the cause of the problem. The audio systems which are vulnerable to audio feedback are those which include an active microphone and an amplification system including loudspeakers, such as a public address system. Audio feedback is a result of sound from the loudspeakers feeding back into the active microphone. The phenomenon is manifested as a high pitched electronic squeal which typically rises in volume until adjustments are made to the audio system to correct the problem. Corrective action typically includes turning down the volume so that the sound which is being propagated by the loudspeakers does not exceed an audio feedback threshold at the microphone. Once the audio feedback threshold is exceeded, a feedback loop arises which requires that corrective action be taken to break the loop.

FIG. 1 shows a typical state of the art audio system 60 as described above. The audio system 60 is shown having two loudspeakers 62 to provide capability for stereo broadcasting. However, only a single loudspeaker 62 is necessary for the audio feedback to occur. The other critical elements of the audio system 60 are the active microphone 64 and an amplification/processing system 66. It should be readily apparent that audio systems capable of live broadcasting of sound involving detection by a microphone can include many other system components. For example, the audio system 60 might be part of a karaoke system which mixes recorded music with live input from a microphone before the mixed sound is emitted from loudspeakers. What is important to recognize is that audio feedback is a result of an audio system having loudspeakers and an audio input, where the audio input picks up enough of the sound coming from the loudspeakers to cause audio feedback. This phenomenon is well understood by those skilled in the art of live audio systems.

To understand the present invention, it is also necessary to relate the present invention od the general acoustic speaker art and the ongoing effort to reproduce sound in its purest form. In an earlier patent application under Ser. No. 08/684,311 of the same inventor, a detailed background of prior art in speaker technology using conventional speakers having radiating elements was reviewed and is hereby incorporated by reference.

There are several disadvantages which are inherent in such conventional speakers. The primary disadvantage is distortion arising from the mass of the moving diaphragm or other radiating component. Related problems arise from distortion developed by mismatch of the radiator element across the spectrum of low, medium and high range frequencies-a problem partially solved by the use of combinations of woofers, midrange and tweeter speakers.

Attempts to reproduce sound without use of a moving diaphragm include technologies embodied in parametric speakers, acoustic heterodyning, beat frequency interference and other forms of modulation of multiple frequencies to generate a new frequency. In theory, sound is developed by the interaction in air (as a nonlinear medium) of two ultrasonic frequencies whose difference in value falls within the audio range. Ideally, resulting compression waves would be projected within the air as a nonlinear medium, and would be heard as pure sound. Despite the ideal theory, general production of sound for practical applications has alluded the industry for over 100 years. Specifically, a basic parametric or heterodyne speaker has not been developed which can be applied in general applications in a manner such as conventional speaker systems. However, there are several patents and matters known to those skilled in the art which demonstrate attempts at creating a parametric speaker system.

For example, a publication by Robert T Beyer of Brown University in 1856 noted the research of H. von Helmholtz commenting on "combination tones—that do not come directly from the sound sources but that arise secondarily through the interaction of the two primary tones." *Ann. Phys. Chem.* 99:497+(1856). These early observations noted that both sum and difference tones were developed, giving rise to theoretical questions of cause. This phenomenon, known in music as Tartini tones, was originally postulated to be a form of beat frequency arising as a difference frequency between two original audible frequencies. In the mid 1800's Helmholtz discovered the presence of the "sum" frequency, suggesting that the phenomenon might be nonlinear. Nevertheless, little progress developed with respect to sum and difference tones as an acoustic phenomenon until the early 1900's.

In 1921, U.S. Pat. No. 1,616,639 disclosed an application of two sound waves of different frequencies simultaneously impressed on a vibrating body (the ear) to form new waves equal to the sum and difference of the two interacting frequencies. The perceived application of this system was as part of an auditorium speaker system as shown in prior art in FIG. 2. Specifically, the reference suggests that a carrier frequency "C" can be amplitude modulated with a sound signal "S" to generate two sideband frequencies C+S and C−S. One of the sideband frequencies (i.e. C−S) is then filtered out, with the remaining sideband (C+S) being transmitted toward an audience 2 from the front end of the auditorium. The carrier frequency C was transmitted from a separate speaker 24 at the opposite end of the auditorium. As these two opposing wave fronts arrive at an audience member, the modulated "difference" wave S is supposedly developed by the ear based on the concurrent imposition of the two high frequencies on the tympanic membrane.

In 1931, U.S. Pat. No. 1,951,669 was issued, teaching a similar concept based on the theory of heterodyning or interference of super-audible air waves. This early system is represented in prior art FIG. 3 and comprises two opposing loud speakers 46 and 47 at opposite ends of a room, each being operated at separate super-audible frequencies 44 and 45. By directing these speakers toward an intermediate region of air, an audible signal was to be formed, based on the difference between the interfering frequencies. However, those skilled in the art are unable to develop meaningful sound from such a configuration where opposing speakers are directed toward each other as illustrated in FIG. 2.

An additional line of thought developing this general theory of sound production is reflected in an article by Peter J. Westervelt, "Parametric Acoustic Array", published in *The Journal of the Acoustical Society of America*, Vol 35, No 4, April 1963. This disclosure, which is admittedly theoretical as opposed to experimental, attempts to mathematically define the requirements for generation of a difference wave as part of a parametric speaker system. After discounting earlier efforts to generate sound when opposing waves intersect at nonzero angles, the article relies on the assumption that if the two separate sound sources can generate two beams of sound which are (i) perfectly collimated, (ii) superimposed and (iii) with a beam of sound so narrow as to constitute a "line" along the axis of the primary beams, sound generation could be achieved. (Page 535, col 2) The system requires use of "a microphone in the carrier beam, and the output of the microphone must then be fed into a conventional radio set in order to demodulate the signal." Id. P 537. Here again, no practical application of this theoretical study has developed, suggesting the absence of one or more key teachings. Neither is any reference made to feedback control or special characteristics of a parametric speaker system in this domain.

After this non-exhaustive but revealing history into the development of the parametric speaker, it is important to note that a commercial quality parametric speaker system which utilizes the phenomenon of acoustical heterodyning was created by the present inventor. In addition to the patent application of the present invention already mentioned above, other patent applications have also been filed by the inventor which teach further refinements of the technology. During the course of investigative research in this general field of parametric or acoustic heterodyning technology, the present inventor discovered an unanticipated property of parametric output which relates to the problems of audio feedback.

With this background as described above, it is observed that there is a serious present need for an audio system which is not vulnerable to the disruptive and costly effects of such audio feedback. It would be a significant advancement to have an audio system which provides sound reproduction without the frustrating potential of audio feedback within the system.

OBJECTS AND SUMMARY OF THE INVENTION

Accordingly, it is an object of the present invention to provide a method and apparatus for eliminating audio feedback from an audio system including an active audio input, an amplifier, and a speaker.

It is another object to provide a method and apparatus for eliminating audio feedback from an audio system which includes a parametric speaker.

It is another object to provide a method and apparatus for eliminating audio feedback from an audio system which includes heterodyne processing of audio input, and a conventional speaker for broadcasting the processed audio input.

The preferred embodiment of the present invention includes an active microphone coupled to an amplifier which transmits signals received at the active microphone to a parametric speaker for broadcasting. In the preferred embodiment, the principle of operation is based on eliminating audio feedback by utilizing a parametric speaker to broadcast the signals.

In another aspect of the invention, it is follows that a conventional speaker system can still be used and audio feedback still eliminated if processing of the signals from the active microphone occurs utilizing the same signal processing which occurs in the audio system which includes a parametric speaker.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of one preferred embodiment of the present invention will be given numerical designations and in which the preferred embodiment of the invention will be discussed so as to enable one skilled in the art to make and use the invention.

Figure 1:
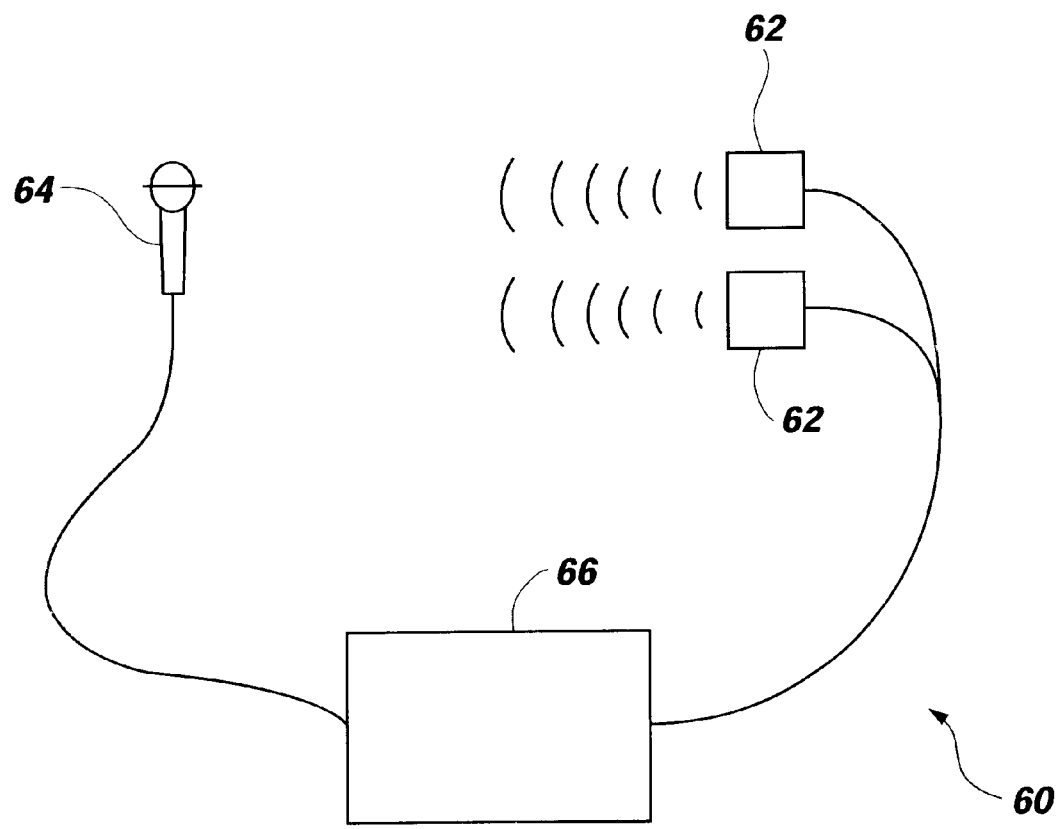
FIG. 1 is a block diagram of the minimal system components of a prior art audio system which is vulnerable to the effects of audio feedback.
Figure 2:
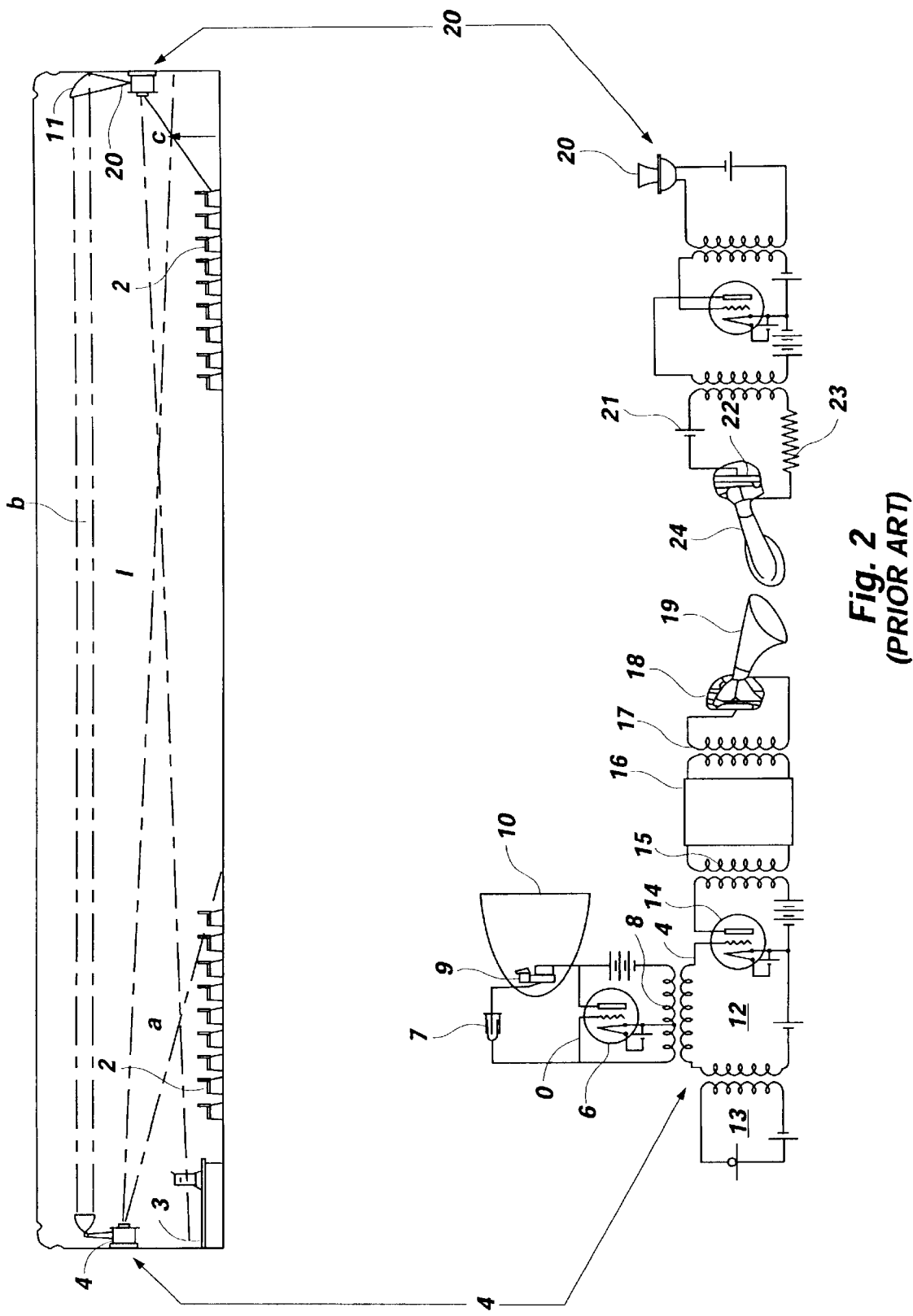
FIG. 2 is a block diagram of a prior art figure consolidated from FIGS. 1 and 2 in U.S. Pat. No. 1,616,639.
Figure 3:
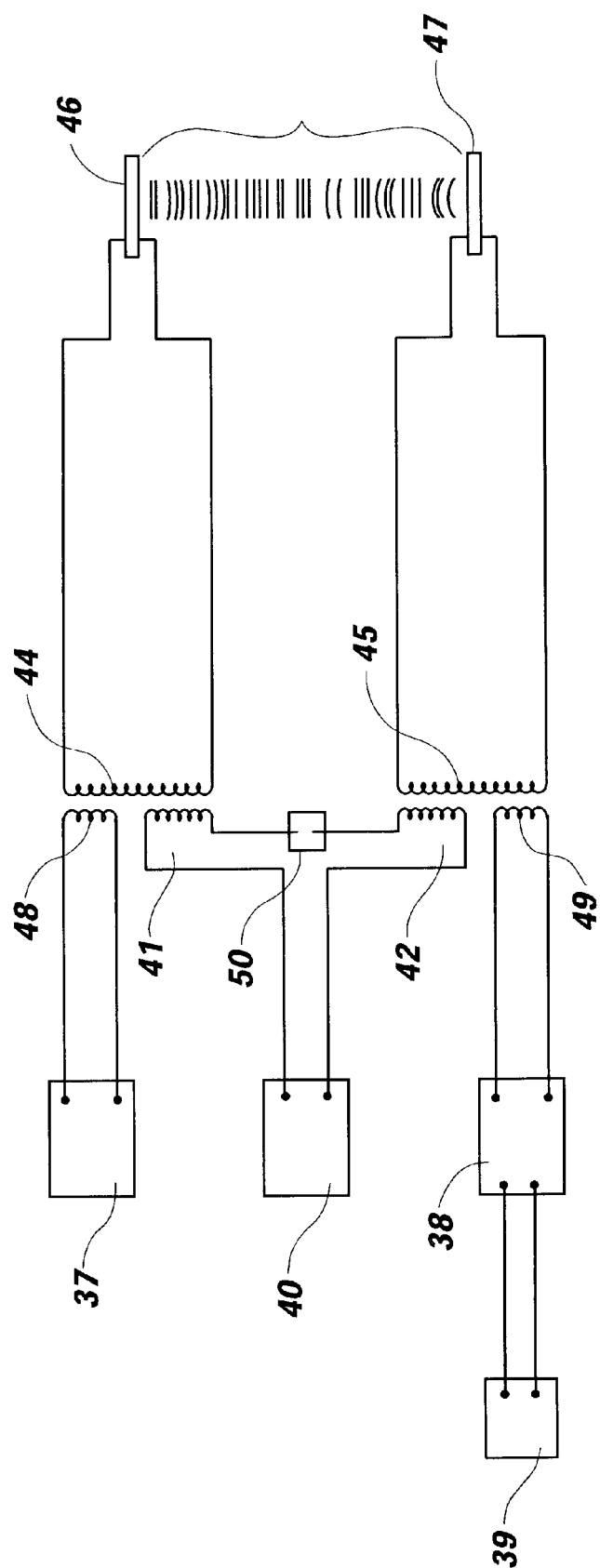
FIG. 3 is a block diagram of a prior art figure extracted from U.S. Pat. No. 1,951,669 and corresponds to FIG. 5 of the referenced patent.
Figure 4:
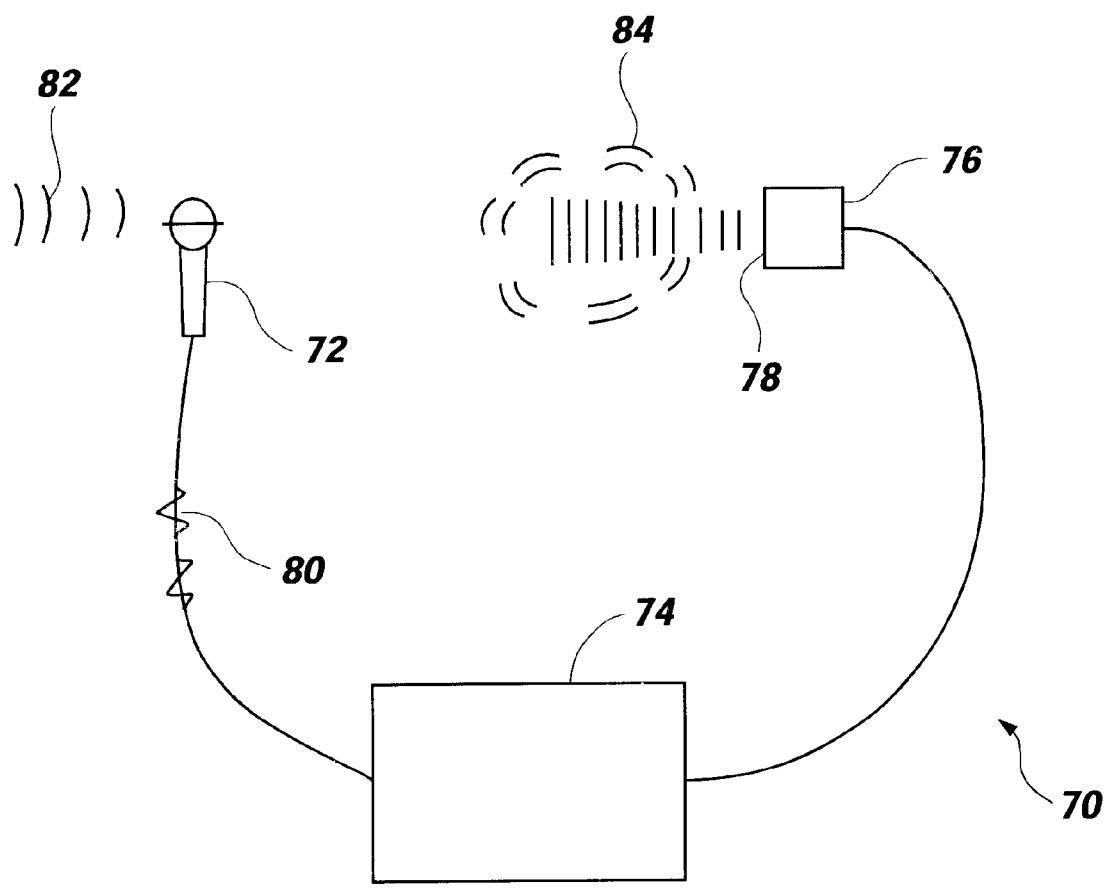
FIG. 4 is a block diagram of the preferred embodiment of the present invention showing the minimal audio system components which function to thereby eliminate audio feedback.

FIG. 4 shows in a block diagram that the preferred embodiment of the present invention is embodied in an audio system 70 which includes an active (live) microphone 72, amplification and processing circuitry 74 and at least one parametric speaker 76. It is well understood by those skilled in the art that the minimal system 70 can be expanded to include other system components. These other system components include, among other things, mixers, receivers, compact disc players, and tape players of various kinds. In other words, input to the audio system 70 can come from many different sources and recordable media. However, the advantages of the present invention are recognized only when at least one source of audio input is an active microphone 72.

The minimal system 70 is illustrated to show the critical elements which when combined, result in an audio system 70 which is not subject to the effects of audio feedback. To demonstrate elimination of audio feedback, the physical configuration of the audio system components 72, 74 and 76 should be arranged such that the microphone 72 is disposed in front of the parametric speaker 76. It should also be obvious that in normal use, however, the audio system 70 should be disposed in a physical configuration which serves the purposes of a live broadcast where the microphone 72 will typically be disposed at a podium or on a stage, and the parametric speaker 76 positioned so that an audience will hear as much sound as possible. Therefore, a face 78 of the parametric speaker is typically turned toward an audience or beamed toward a reflective element which redirects emitted sound to the audience.

An explanation of the operation of the audio system 70 and how audio feedback is eliminated is as follows. The microphone 72 is actively functioning as a transducer, receiving an audio signal 82 and generating electrical signals 80 which are representative of the received audio 82. The detailed function of the microphone 72 is well known to those skilled in the art and further explanation is unnecessary.

The electrical signals 80 are transmitted to processing circuitry 74. After processing, the electrical signals 80 are transmitted to the parametric speaker 76 for emission therefrom as an audible signal 84. The audible signal 84 from the parametric speaker 76 is typically the original audio signal 82 which has been amplified. It should be obvious, however, that the original audio signal 82 can be manipulated in other ways which do not alter the basic operations of the present invention.

The processing of the electrical signals 80 for emission via the parametric speaker 76 depends upon several factors. For example, in the preferred embodiment, a single parametric speaker 76 is used to emit the audible signal 84. In order for the single parametric speaker 76 to operate as described requires an understanding of acoustical heterodyning and parametric speakers. A detailed understanding can be obtained through the materials disclosed in U.S. patent application Ser. Nos. 08/684,311 and 08/744,114 which are hereby incorporated by reference.

Figure 5:
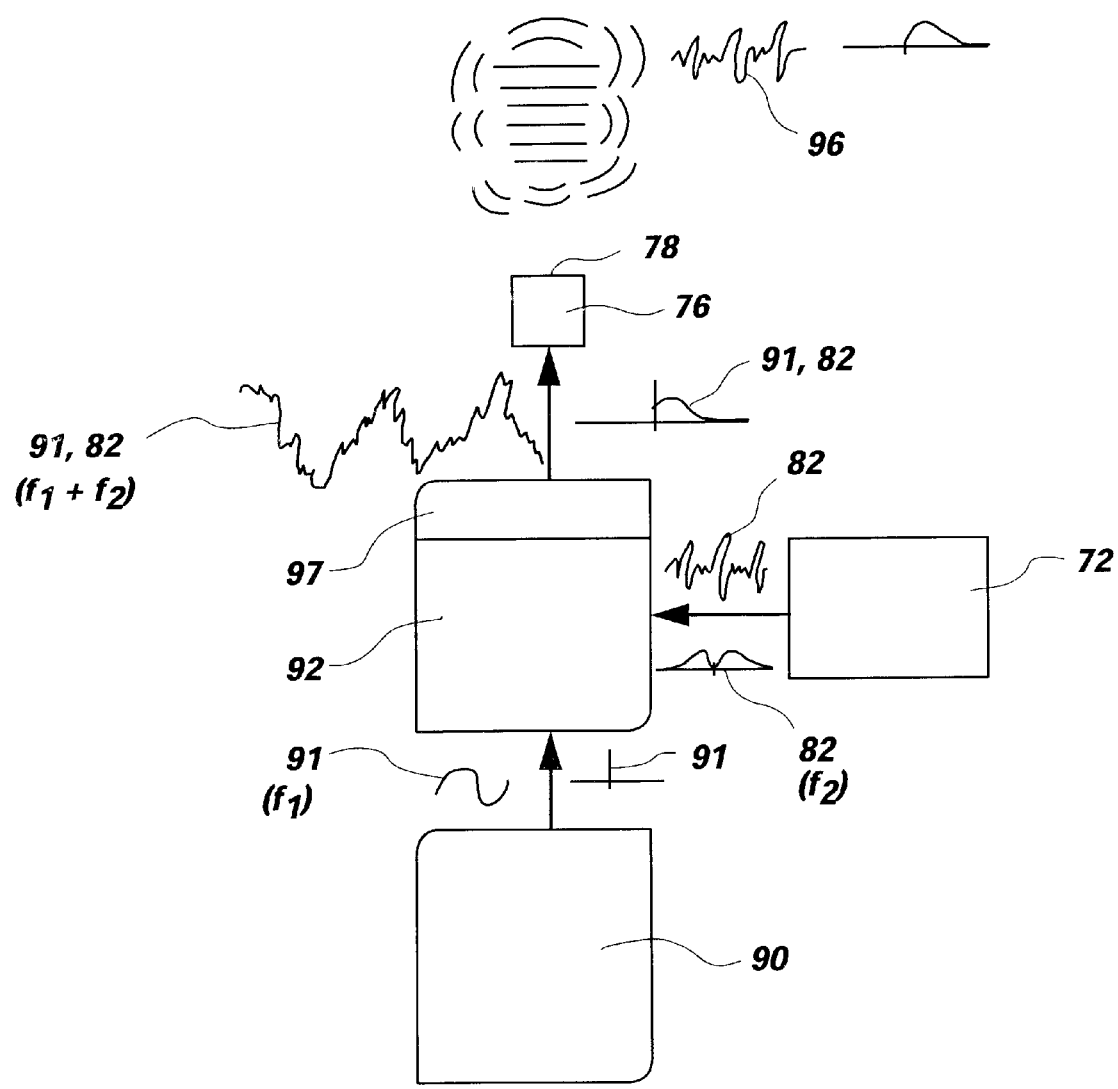
FIG. 5 is a block diagram which provides a detailed description of the components of the processing circuitry in the preferred embodiment.

A brief explanation of the signal processing which occurs in the processing circuitry 74 is nevertheless provided. FIG. 5 provides a detailed description of the components of the processing circuitry 74 in the preferred embodiment. This apparatus 74 comprises an oscillator or digital ultrasonic wave source 90 for providing a base or carrier wave 91. This wave 91 is generally referred to as a first ultrasonic wave or primary wave. An amplitude modulating component 92 is coupled to the output of the ultrasonic generator 90 and receives the base frequency 91 for mixing with the audible input signal 82. The sonic input signal 82 may be supplied in either analog or digital form, and could be music or voice from any conventional signal source such as the active microphone 72 or other form of sound. If the input signal 82 includes upper and lower sidebands as shown in FIG. 5, a filter component may be included in the modulator to yield a single sideband output on the modulated carrier frequency, depending on the frequency output desired.

A transducer or parametric speaker 76 emits the ultrasonic frequencies $f_1$ and $f_2$ as a new wave form propagated at the face 78 of the speaker 76. This new wave form interacts within the nonlinear medium of air to generate the difference frequency 96, as a new sonic or subsonic wave.

The audio system 70 is able to function as described because the compression waves corresponding to $f_1$ and $f_2$ interfere in air according to the principles of acoustical heterodyning. Acoustical heterodyning is somewhat of a mechanical counterpart to the electrical heterodyning effect which takes place in a non-linear circuit. For example, amplitude modulation in an electrical circuit is a heterodyning process. The heterodyne process itself is simply the creation of two new waves. The new waves are the sum and the difference of two fundamental waves.

In acoustical heterodyning, the new waves equaling the sum and difference of the fundamental waves are observed to occur when at least two ultrasonic compression waves interact or interfere in air. The preferred transmission medium of the present invention is air because it is a highly compressible medium that responds non-linearly under different conditions. This non-linearity of air is possibly what enables the heterodyning process to take place without using an electrical circuit. However, it should be remembered that any compressible fluid can function as the transmission medium if desired.

As related above, the acoustical heterodyning effect results in the creation of new compression waves corresponding to the sum and the difference of ultrasonic waves $f_1$ and $f_2$. The sum is an inaudible ultrasonic wave which is of little interest and is therefore not shown. The difference, however, can be sonic or subsonic, and is shown as a compression wave 96.

FIG. 5 also lists as a component of the system 70 a means for combining signals 92. This device performs the function of modifying the ultrasonic wave trains being generated by the ultrasonic signal source 90. This modification consists of the means 92 for combining signals by combining a first ultrasonic signal 91 with an electrical signal 93, representing the new compression wave 96 to be generated.

The method of combining signals 91 and 80 in the present invention is preferably accomplished through amplitude modulation. Therefore the means for combining signals in the first embodiment is an amplitude modulator 92. This yields a carrier wave modulated with upper and lower sidebands. In this invention, the upper sideband is used because it represents a non-inverted signal which will become the new compression wave. The lower sideband frequency is canceled by use of filtering circuitry 97.

An important feature of the present invention is that the base frequency and single sideband are propagated from the same transducer face 78. Therefore the component waves are perfectly collimated. Furthermore, phase alignment is at maximum, providing the highest level of interference possible between two different ultrasonic frequencies. With maximum interference insured between these waves, one achieves the greatest energy transfer to the air molecules, which becomes the "speaker" radiating element in a parametric speaker.

While researching this novel form of sound generation, the present inventor discovered an unexpected and somewhat surprising absence of audio feedback, although it is not yet precisely understood why parametric processing of the original audio signal 82 eliminates audio feedback. Experimental efforts have confirmed this result. Indeed, the audio system 70 described in the preferred embodiment of the present invention does not suffer from the effects of audio feedback.

It is envisioned that there are other useful applications of the principle learned from the elimination of audio feedback using a parametric speaker system. One important principle is demonstrated in an alternative embodiment of the present invention.

Figure 6:
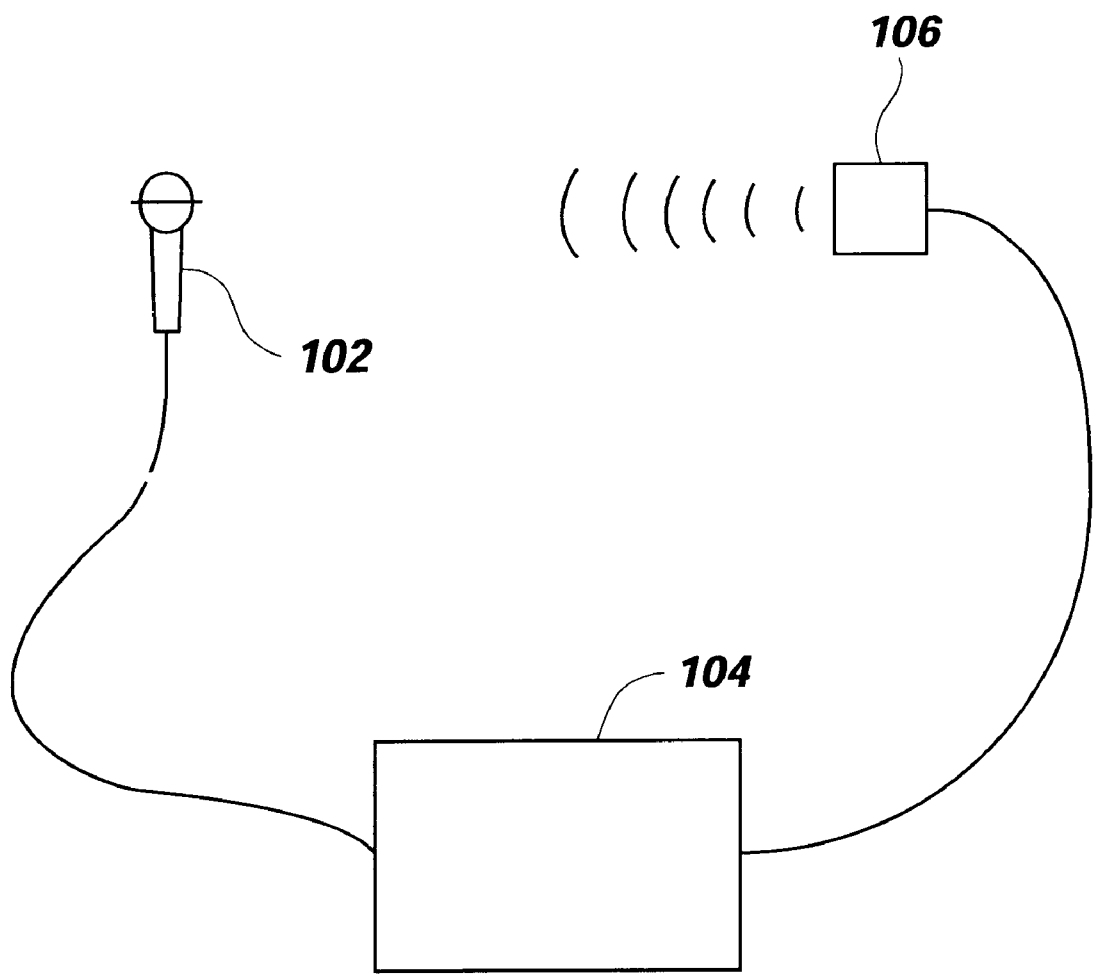
FIG. 6 is a block diagram illustrating an alternative embodiment which includes an active microphone, the processing circuitry of the parametric speaker system shown in FIG. 5, and a conventional speaker instead of the parametric speaker of the preferred embodiment.

For example, FIG. 6 shows an alternative embodiment which includes an active microphone 102, the processing circuitry 104 of the parametric speaker system shown in FIG. 5, and a conventional speaker 106 instead of the parametric speaker of the preferred embodiment. The conventional speaker 106 generates audible sound directly, whereas the parametric speaker 76 does so indirectly. It is important to recognize that it is logical to assume that the principles of operation of the preferred embodiment can also apply to an audio system 104 which does not utilize a parametric speaker as the final output audio source.

It is important to note that without additional processing, the processing circuitry 74 (FIG. 5) used to prepare the original audio signal 82 for emission from the parametric speaker 76 will not result in an audible signal from the conventional speaker 106. This is because the conventional speaker is not capable of generating ultrasonic frequencies like the parametric speaker 76. Consequently, once the original audible signal 82 is amplitude modulated onto the base carrier frequency, the audible signal 82 can be recovered by demodulation within an acoustic heterodyning system.

Figure 7:
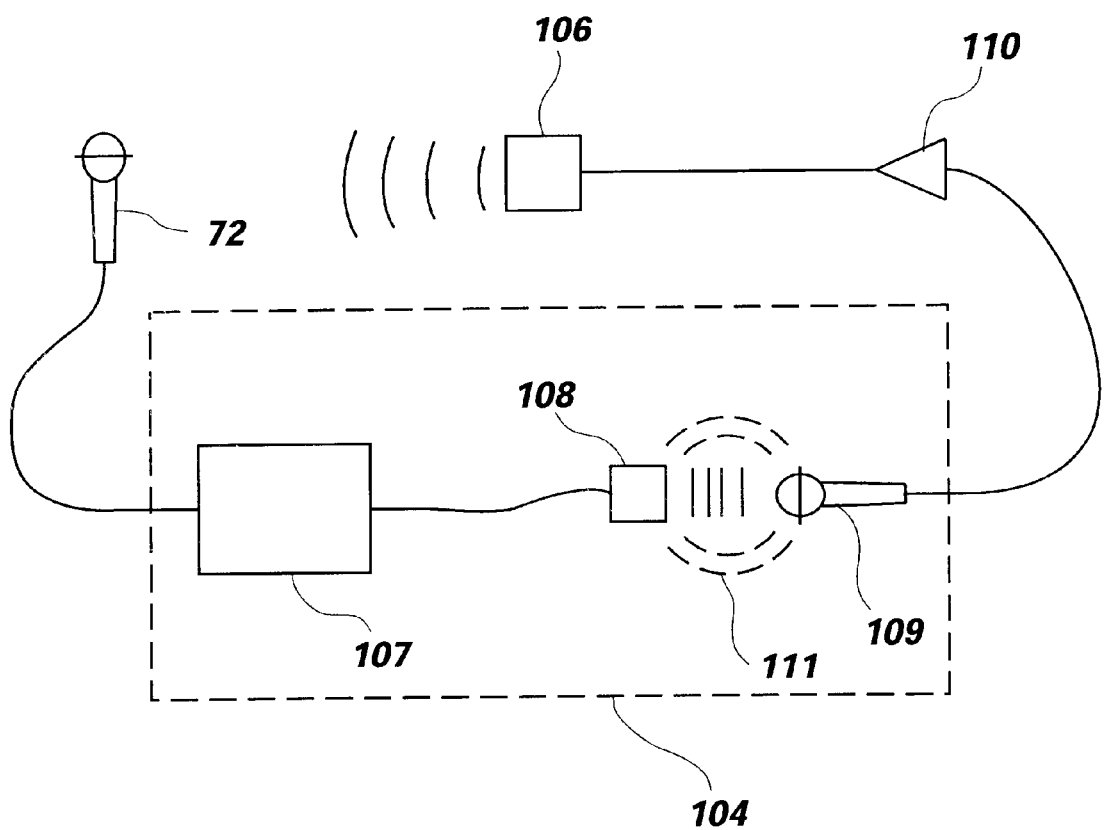
FIG. 7 graphically illustrates a more detailed version of the system shown in FIG. 6.
Figure 8:
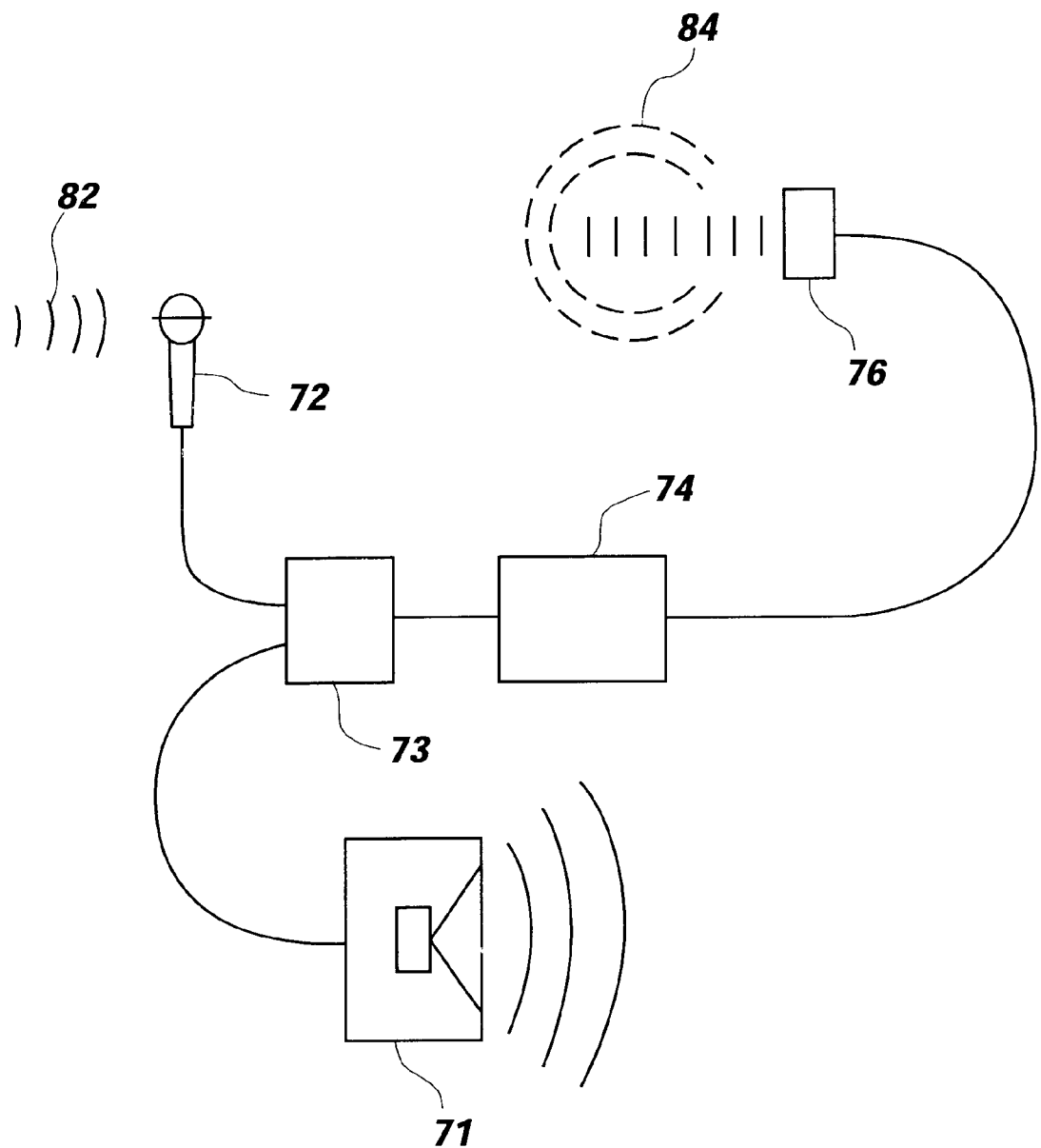
FIG. 8 depicts an additional embodiment combining both audio and parametric systems in a single device.

FIG. 7 provides further detail to the general embodiment of FIG. 6. Specifically, audio sound waves are detected by a transducer such as microphone 72. An electric signal is supplied by the transducer to the parametric signal processing circuitry 107. The basic components of such circuitry are well known to those skilled in the art and are generally represented in FIG. 5. Included in this circuitry is a power amplifier (not shown) which drives an ultrasonic transducer or parametric emitter 108. Parametric output 111 is received by a sensor or transducer 109, shown here as a microphone. These components, enclosed within phantom line 104 correspond generally to the same item of FIG. 6. The output of transducer 109 comprises an audio signal corresponding to the demodulated audio output from the parametric output 111. This stage of conversion of parametric output to audio output may be accomplished directly by a transducer or electronic circuit capable of nonlinear response to the modulated parametric signal generated in processor 107.

In either configuration, the output from circuitry 104 couples an amplifier 110 or other processing circuitry which drives loudspeaker 106. Accordingly, the audio output from speaker 106 is feedback controlled, relative to its interaction with microphone 72.

FIG. 7 illustrates a composite system which incorporates the feedback control of a parametric speaker with conventional audio output of a woofer or other low frequency loudspeaker. Such a system is useful in view of the greater need for feedback control in the higher frequencies, as opposed to low frequency ranges below 1000 Hz. In this embodiment, the system utilizes a frequency dividing circuit 73 coupled to an audio signal source 72 in combination with the parametric speaker processor 74. Specifically, an audio signal source 72 detects sound and provides the audio signal.

The frequency dividing circuit 73 is coupled to the audio signal source 72, providing for division of at least two frequency ranges with separate signal outputs. This range may provide upper frequencies from 1000 Hz to 20,000 Hz to the parametric processor 74, and the lower frequencies below 1000 Hz. Most preferably, the low range would fall below 500 Hz.

At least one of the separate signal outputs is coupled to the parametric speaker processor 74 for feedback control, and a second output is coupled to a direct audio sound system 71. This may be a woofer or other low range transducer.

It is to be understood that the above-described embodiments are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A system for eliminating audio feedback, comprising:
   at least one speaker member;
   at least one microphone for detecting at least one sonic frequency emitted from the speaker member and for generating an electrical signal representative of the at least one sonic frequency;
   processing means coupled to the microphone means for receiving the electrical signal wherein the processing means comprises the following parametric speaker components in which all signals received from the microphone are processed as a single wave form for parametric output through said parametric speaker components;
   a) ultrasonic frequency generating means for generating a first ultrasonic frequency;
   b) modulating means coupled to the ultrasonic frequency generating means and the processing means for generating a new wave form electronically which includes the at least one first and second ultrasonic frequency having a difference in value equal to the at least one sonic frequency; and
   at least one ultrasonic frequency emitter coupled to the modulating means and acoustically coupled to the speaker member for concurrently propagating from a common emitter face (i) the first ultrasonic frequency and (ii) the at least one second ultrasonic frequency which interacts with the first ultrasonic frequency within a compressible transmission medium to thereby generate the at least one sonic frequency free of audio feedback.

2. The system for eliminating audio feedback as defined in claim 1 wherein the at least one microphone means for detecting the at least one sonic frequency and generating an electrical signal representative of the at least one sonic frequency is comprised of an active microphone.

3. The system for eliminating audio feedback as defined in claim 1 wherein the modulating means further comprises an ultrasonic frequency signal generator which generates and transmits the second ultrasonic frequency to the at least one ultrasonic frequency emitter and to the modulating means, to thereby generate the at least one sonic frequency.

4. The system for eliminating audio feedback as defined in claim 1 wherein the at least one sonic frequency is a live sound source.

5. The system for eliminating audio feedback as defined in claim 4 wherein the live sound source is selected from the group of live sound sources consisting of speech, singing, musical instruments and other sonic sound generating devices.

6. The system for eliminating audio feedback as defined in claim 1 wherein the at least one ultrasonic frequency emitter is comprised of ultrasonic acoustical transducers.

7. A system as defined in claim 1, wherein the modulating means further comprises mixing means for electronically combining the first and second ultrasonic frequencies to form a single new wave form representing the sum of the first and second ultrasonic frequencies, said system including means for transmitting the single new wave form to the common emitter face for propagation into air.

8. A system as defined in claim 1, wherein the modulating means comprises means for amplitude modulating the first ultrasonic frequency with the at least one sonic frequency to generate the second ultrasonic frequency as at least one sideband to the first ultrasonic frequency.

9. The system as defined in claim 8, further comprising filtering means coupled to the amplitude modulating means for eliminating one of the sidebands.

10. The system as defined in claim 1 wherein the ultrasonic frequency generating means (i) generates and transmits the second ultrasonic frequency to the at least one ultrasonic frequency emitter, and (ii) transmits the second ultrasonic frequency to the modulating means and wherein the modulating means includes input means for mixing audible sounds with the second ultrasonic frequency as upper and lower sidebands.

11. A system for eliminating audio feedback, comprising:
    at least one transducer for detecting at least one sonic frequency and generating an electrical signal representative of the at least one sonic frequency;
    processing means for receiving the electrical signal and generating a first ultrasonic frequency which has modulated thereon the at least one sonic frequency;
    parametric demodulating means for recovering the at least one sonic frequency from the first ultrasonic frequency;
    transducer means for receiving and converting the at least one sonic frequency to a feedback controlled audio signal; and
    at least one audio speaker coupled to the transducer for directly emitting the feedback controlled audio signal.

12. The system for eliminating audio feedback as defined in claim 11 wherein the at least one transducer for receiving the at least one sonic frequency and generating an electrical signal representative of the at least one sonic frequency is comprised of an active microphone.

13. The system for eliminating audio feedback as defined in claim 11 wherein the audio speaker is further comprised of a conventional speaker capable of generating sound in the audible frequency range.

14. A method for eliminating audio feedback from an audio system generating at least one sonic frequency, said method comprising the steps of:
    (1) receiving at a microphone the at least one sonic frequency as a total audio signal to be processed at an input of the audio system;
    (2) processing the total audio signal, including the at least one sonic frequency by modulating the total audio signal with an ultrasonic carrier frequency to generate a new wave form electronically as a total audio signal to be processed to thereby prepare it for emission from a parametric speaker by combining the at least one sonic frequency with an ultrasonic frequency carrier wave; and
    (3) emitting the ultrasonic frequency carrier wave combined with the at least one sonic frequency from the parametric speaker without bypassing any portion of the signal to a nonparametric speaker to thereby generate the at least one sonic frequency as an audible sound free of audio feedback.

15. The method for eliminating audio feedback as defined in claim 14 wherein the step of receiving the at least one sonic frequency at an input of the audio system further comprises receiving the at least one frequency at an active microphone.

16. The method for eliminating audio feedback as defined in claim 14 wherein the step of processing the at least one sonic frequency further comprises the step of amplitude modulating the at least one sonic frequency onto the ultrasonic frequency carrier wave.

17. The method for eliminating audio feedback as defined in claim 14 wherein the step of processing the at least one sonic frequency further comprises the steps of concurrently propagating from a common emitter face of the parametric speaker (i) a second ultrasonic wave train having a second ultrasonic frequency and (ii) a first ultrasonic wave train having the ultrasonic frequency carrier wave which interacts with the second ultrasonic wave train within a compressible transmission medium.

18. The method for eliminating audio feedback as defined in claim 17 wherein the step of processing the at least one sonic frequency further comprises the step of electronically combining the first and second ultrasonic wave trains to form a single new wave electronic form representing the sum of the first and second ultrasonic wave trains.

19. A method for eliminating audio feedback from an audio system generating at least one sonic frequency, said method comprising the steps of:
    (1) receiving the at least one sonic frequency at an input of the audio system;
    (2) processing the at least one sonic frequency to thereby prepare it for emission from a parametric speaker by modulating the at least one sonic frequency with an ultrasonic frequency carrier wave to form a parametric output signal;
    (3) demodulating the parametric output signal to generate a feedback controlled sonic frequency corresponding to the at least one sonic frequency;
    (4) emitting the feedback controlled sonic frequency from a conventional speaker capable of emitting sonic frequencies to thereby generate the at least one sonic frequency as an audible sound.

20. A system for eliminating audio feedback, comprising:
    a parametric speaker processor having an audio input for receiving audio signal to be amplified for broadcast through an audio speaker, said processor including:
        a) an ultrasonic frequency generator for generating at least one ultrasonic frequency to be used as a carrier frequency; and
        b) modulating means coupled to the ultrasonic frequency generator for modulating the audio signal onto the carrier frequency as a parametric signal for emission as parametric output capable of decoupling and regenerating the audio signal within a nonlinear medium;
    a nonlinear medium coupled to the parametric output for demodulating the audio signal from the ultrasonic carrier frequency as a feedback controlled audio signal; and
    audio circuitry coupled to the nonlinear medium for receiving the feedback controlled audio signal for use in an speaker.

21. A system as defined in claim 20, wherein the nonlinear medium further comprises:
    a parametric emitter for generating parametric output;
    air as the nonlinear medium; and
    a transducer capable of receiving the parametric output and conveying audio signal to the audio circuitry.

22. A system as defined in claim 20, further comprising a frequency dividing circuit coupled to an audio signal source in combination with the parametric speaker processor, said system comprising:
    an audio signal source for supplying audio signal for use as part of a sound system;

a frequency dividing circuit coupled to the audio signal source, said dividing circuit providing for division of at least two frequency ranges with separate signal outputs;

at least one of the separate signal outputs being coupled to the parametric speaker processor for feedback control; and at least one of the separate signal outputs being coupled to a direct audio sound system.

23. A system as defined in claim 22, wherein the direct audio sound system comprises a low frequency loudspeaker.

* * * * *